(12) United States Patent
Vargas

(10) Patent No.: US 11,748,866 B2
(45) Date of Patent: Sep. 5, 2023

(54) SYSTEMS AND METHODS OF AUTOMATED DETECTION OF GAS PLUMES USING OPTICAL IMAGING

(71) Applicant: SeekOps Inc., Austin, TX (US)

(72) Inventor: Guillermo Vargas, Austin, TX (US)

(73) Assignee: SEEKOPS INC., Austin, TX (US)

( * ) Notice: Subject to any disclaimer, the term of this patent is extended or adjusted under 35 U.S.C. 154(b) by 266 days.

(21) Appl. No.: 17/374,550

(22) Filed: Jul. 13, 2021

(65) Prior Publication Data

US 2022/0020141 A1 Jan. 20, 2022

Related U.S. Application Data

(60) Provisional application No. 63/053,376, filed on Jul. 17, 2020.

(51) Int. Cl.
*G06T 17/00* (2006.01)
*G06T 7/00* (2017.01)
(Continued)

(52) U.S. Cl.
CPC .......... *G06T 7/0004* (2013.01); *G01J 5/0014* (2013.01); *G01M 3/20* (2013.01); *G06T 7/20* (2013.01);
(Continued)

(58) Field of Classification Search
CPC .......... G06K 9/00711; G06K 9/00744; H04N 7/181; A61B 5/445; A61B 90/90;
(Continued)

(56) References Cited

U.S. PATENT DOCUMENTS 3,780,566 A 12/1973 Smith et al.
4,135,092 A 1/1979 Milly
(Continued)

FOREIGN PATENT DOCUMENTS

CN 205749271 U 11/2016
CN 106769977 A 5/2017
(Continued)

OTHER PUBLICATIONS

U.S. Appl. No. 62/687,147, filed Jun. 19, 2018, Brandon James Smith.
(Continued)

*Primary Examiner* — Phuoc H Doan
(74) *Attorney, Agent, or Firm* — Concept IP LLP; Michael Zarrabian

(57) ABSTRACT

Systems, devices, and methods including: an optical gas imaging (OGI) camera; a processor in communication with the OGI camera, the processor configured to: capture at least two images of a scene with the camera; compare the captured at least two images to determine at least one of: a motion associated with a movement of the camera and a motion associated with a movement of a gas plume; apply a color to each pixel of the captured images based on at least one of: a direction of movement and a velocity of movement between the at least two captured images; subtract pixels from the colored pixels associated with the movement of the camera; and generate an image of an output of a gas plume based on the subtracted pixels and the applied color pixels.

20 Claims, 12 Drawing Sheets

(51) Int. Cl.
*G01J 5/00* (2022.01)
*G01M 3/20* (2006.01)
*G06T 11/00* (2006.01)
*G06T 7/20* (2017.01)

(52) U.S. Cl.
CPC ..... *G06T 11/001* (2013.01); *G01J 2005/0077* (2013.01); *G06T 2207/10048* (2013.01); *G06T 2207/30108* (2013.01); *G06T 2207/30244* (2013.01)

(58) Field of Classification Search
CPC ....... G16H 40/20; G01S 7/4817; G01S 17/08; G01N 21/39; G01N 21/3504; G06T 7/0004; G06T 7/20; G06T 11/001
See application file for complete search history.

(56) References Cited

U.S. PATENT DOCUMENTS

| | | | |
|---|---|---|---|
| 4,233,564 A | 11/1980 | Kerbel | |
| 4,507,558 A | 3/1985 | Bonne | |
| 4,988,833 A | 1/1991 | Lai | |
| 5,047,639 A | 9/1991 | Wong | |
| 5,075,619 A | 12/1991 | Said | |
| 5,173,749 A | 12/1992 | Tell et al. | |
| 5,317,156 A | 5/1994 | Cooper et al. | |
| 5,822,058 A | 10/1998 | Adler-Golden et al. | |
| 6,064,488 A | 5/2000 | Brand et al. | |
| 6,509,566 B1 | 1/2003 | Wamsley et al. | |
| 6,549,630 B1 | 4/2003 | Bobisuthi | |
| 7,833,480 B2 | 11/2010 | Blazewicz et al. | |
| 8,294,899 B2 | 10/2012 | Wong | |
| 8,730,461 B2 | 5/2014 | Andreussi | |
| 9,183,371 B2 | 11/2015 | Narendra et al. | |
| 9,183,731 B1 | 11/2015 | Bokhary | |
| 9,235,974 B2 | 1/2016 | Johnson, Jr. et al. | |
| 9,250,175 B1 | 2/2016 | McManus | |
| 9,599,529 B1 | 3/2017 | Steele et al. | |
| 10,023,323 B1 | 7/2018 | Roberts et al. | |
| 10,126,200 B1 | 11/2018 | Steele et al. | |
| 10,268,198 B2 | 4/2019 | Mantripragada et al. | |
| 10,429,546 B1 | 10/2019 | Ulmer | |
| 10,830,034 B2 | 11/2020 | Cooley et al. | |
| 11,299,268 B2 | 4/2022 | Christensen et al. | |
| 11,519,855 B2* | 12/2022 | Black ..................... G01N 21/39 | |
| 2002/0005955 A1 | 1/2002 | Kramer et al. | |
| 2003/0160174 A1 | 8/2003 | Grant et al. | |
| 2003/0189711 A1 | 10/2003 | Orr et al. | |
| 2003/0230716 A1 | 12/2003 | Russell et al. | |
| 2004/0012787 A1 | 1/2004 | Galle et al. | |
| 2004/0212804 A1 | 10/2004 | Neff et al. | |
| 2006/0015290 A1 | 1/2006 | Warburton et al. | |
| 2006/0044562 A1 | 3/2006 | Hagene et al. | |
| 2006/0234621 A1 | 10/2006 | Desrochers et al. | |
| 2007/0137318 A1 | 6/2007 | Desrochers et al. | |
| 2008/0243372 A1 | 10/2008 | Bodin et al. | |
| 2009/0201507 A1 | 8/2009 | Kluczynski et al. | |
| 2009/0263286 A1 | 10/2009 | Isomura et al. | |
| 2010/0147081 A1 | 6/2010 | Thomas | |
| 2011/0074476 A1 | 3/2011 | Heer et al. | |
| 2011/0150035 A1 | 6/2011 | Hanson et al. | |
| 2011/0257944 A1 | 10/2011 | Du et al. | |
| 2012/0120397 A1 | 5/2012 | Furtaw et al. | |
| 2013/0044314 A1 | 2/2013 | Koulikov et al. | |
| 2013/0076900 A1 | 3/2013 | Mrozek et al. | |
| 2013/0208262 A1 | 8/2013 | Andreussi | |
| 2014/0172323 A1 | 6/2014 | Marino | |
| 2014/0204382 A1 | 7/2014 | Christensen | |
| 2014/0236390 A1 | 8/2014 | Mohamadi | |
| 2014/0336957 A1 | 11/2014 | Hanson et al. | |
| 2015/0072633 A1 | 3/2015 | Massarella et al. | |
| 2015/0275114 A1 | 10/2015 | Tumiatti et al. | |
| 2015/0295543 A1 | 10/2015 | Brown et al. | |
| 2015/0316473 A1 | 11/2015 | Kester et al. | |
| 2016/0018373 A1 | 1/2016 | Pagé et al. | |
| 2016/0202225 A1 | 7/2016 | Feng et al. | |
| 2016/0214715 A1 | 7/2016 | Meffert | |
| 2016/0307447 A1 | 10/2016 | Johnson et al. | |
| 2017/0003684 A1 | 1/2017 | Knudsen | |
| 2017/0057081 A1 | 3/2017 | Krohne et al. | |
| 2017/0097274 A1 | 4/2017 | Thorpe et al. | |
| 2017/0115218 A1 | 4/2017 | Huang et al. | |
| 2017/0134497 A1 | 5/2017 | Harter et al. | |
| 2017/0158353 A1 | 6/2017 | Schmick | |
| 2017/0199647 A1 | 7/2017 | Richman et al. | |
| 2017/0206648 A1 | 7/2017 | Marra et al. | |
| 2017/0235018 A1 | 8/2017 | Foster et al. | |
| 2017/0307519 A1 | 10/2017 | Black et al. | |
| 2017/0336281 A1 | 11/2017 | Waxman et al. | |
| 2018/0023974 A1 | 1/2018 | Otani et al. | |
| 2018/0045561 A1 | 2/2018 | Leen et al. | |
| 2018/0050798 A1 | 2/2018 | Kapuria | |
| 2018/0059003 A1 | 3/2018 | Jourdainne | |
| 2018/0067066 A1 | 3/2018 | Giedd et al. | |
| 2018/0109767 A1 | 4/2018 | Li et al. | |
| 2018/0127093 A1 | 5/2018 | Christensen et al. | |
| 2018/0188129 A1 | 7/2018 | Choudhury et al. | |
| 2018/0259955 A1 | 9/2018 | Noto | |
| 2018/0266241 A1 | 9/2018 | Ferguson et al. | |
| 2018/0284088 A1 | 10/2018 | Verbeck, IV | |
| 2018/0292374 A1 | 10/2018 | Dittberner et al. | |
| 2019/0011920 A1 | 1/2019 | Heinonen et al. | |
| 2019/0011935 A1 | 1/2019 | Ham et al. | |
| 2019/0025199 A1 | 1/2019 | Koulikov | |
| 2019/0033194 A1 | 1/2019 | DeFreez et al. | |
| 2019/0077506 A1 | 3/2019 | Shaw et al. | |
| 2019/0086202 A1 | 3/2019 | Guan et al. | |
| 2019/0095687 A1 | 3/2019 | Shaw et al. | |
| 2019/0178743 A1 | 6/2019 | McNeil | |
| 2019/0195789 A1 | 6/2019 | Pan et al. | |
| 2019/0212419 A1* | 7/2019 | Jeong ..................... G01S 17/08 | |
| 2019/0331652 A1 | 10/2019 | Ba et al. | |
| 2020/0109976 A1 | 4/2020 | Ajay et al. | |
| 2020/0400635 A1 | 12/2020 | Potyrailo et al. | |
| 2021/0017926 A1 | 1/2021 | Alkadi et al. | |
| 2021/0190745 A1 | 6/2021 | Buckingham et al. | |
| 2021/0255158 A1 | 8/2021 | Smith et al. | |

FOREIGN PATENT DOCUMENTS

| | | |
|---|---|---|
| CN | 109780452 A | 5/2019 |
| CN | 112213443 A | 1/2021 |
| DE | 69333010 | 4/2004 |
| EP | 1371962 B1 | 7/2011 |
| FR | 3047073 B1 | 8/2019 |
| JP | 200975823 A | 4/2009 |
| KR | 20170062813 A | 6/2017 |
| KR | 101770254 B1 | 8/2017 |
| WO | 1999054700 A2 | 10/1999 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020206020 A1 | 10/2020 |

OTHER PUBLICATIONS

"SAFESITE Multi-Threat Detection System", Jul. 11, 2012 (Jul. 11, 2012), pp. 1-6, XP055245980.

International Search Report and Written Opinion for PCT/US19/38011 dated Sep. 9, 2019.

International Search Report and Written Opinion for PCT/US19/38015, dated Oct. 18, 2019.

International Search Report and Written Opinion for PCT/US19/44119, dated Oct. 17, 2019.

International Search Report and Written Opinion for PCT/US20/26228 dated Jul. 1, 2020.

(56) References Cited

OTHER PUBLICATIONS

International Search Report and Written Opinion for PCT/US20/26232 dated Jun. 26, 2020.
International Search Report and Written Opinion for PCT/US20/26246 dated Jun. 29, 2020.
International Search Report and Written Opinion for PCT/US20/51696, dated Feb. 3, 2021.
International Search Report and Written Opinion for PCT/US2020/044978, dated Oct. 26, 2020.
International Search Report and Written Opinion for PCT/US2021/016821 dated Apr. 26, 2021.
International Search Report and Written Opinion for PCT/US2021/024177, dated Jun. 23, 2021.
International Search Report and Written Opinion for PCT/US2021/056708, dated Jan. 27, 2022.
International Search Report and Written Opinion for PCT/US21/42061, dated Nov. 26, 2021.
International Search Report and Written Opinion for PCT/US21/44532, dated Jan. 11, 2022.
International Search Report and Written Opinion for PCT/US21/56710, dated Feb. 23, 2022.
International Search Report and Written Opinion of PCT/US19/57305, dated Jan. 2, 2020.
International Search Report and Written Opinion of PCT/US20/54117, dated Dec. 22, 2020.
Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Khan, "Low Power Greenhouse Gas Sensors for Unmanned Aerial Vehicles", Remote Snse. 2012, 4, 1355-1368.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
International Search Report and Written Opinion for PCT/US22/38951, dated Nov. 28, 2022.
Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.
Krings et al., Atmos. Meas. Tech., 11, 721-739, Feb. 7, 2018.
International Search Report and Written Opinion for PCT/US23/13893, dated Jun. 30, 2023.
Lilian Joly, The evolution of Amulse (Atmospheric Measurements by Ultra-Light Spectrometer) and its interest in atmospheric applications. Results of the Atmospheric Profiles of GreenhousE gasEs (APOGEE) weather balloon release campaign for satellite retrieval validation, p. 1-28, Sep. 25, 2019, Atmospheric Measurement Techniques Discussion (Joly).

\* cited by examiner

SYSTEMS AND METHODS OF AUTOMATED DETECTION OF GAS PLUMES USING OPTICAL IMAGING

CROSS-REFERENCE TO RELATED APPLICATIONS

This application claims priority to and the benefit of U.S. Provisional Patent Application No. 63/053,376, filed Jul. 17, 2020, the contents of which are hereby incorporated by reference herein for all purposes.

TECHNICAL FIELD

Embodiments relate generally to detection of gas plumes, and more particularly to automated detection of gas plumes using optical gas imaging.

BACKGROUND

Methane ($CH_4$) is an odorless and colorless naturally occurring organic molecule, which is present in the atmosphere at average ambient levels of approximately 1.85 ppm as of 2018 and is projected to continually climb. While methane is found globally in the atmosphere, a significant amount is collected or "produced" through anthropogenic processes including exploration, extraction, and distribution of petroleum in the form of natural gas. Natural gas, an odorless and colorless gas, is a primary source of energy used to produce electricity and heat. The main component of natural gas is methane (93.9 mol % $CH_4$ typ.). While extraction of natural gas is a large source of methane released to atmosphere, major contributors of methane also include livestock farming (enteric fermentation), and solid waste and wastewater treatment (anaerobic digestion). Optical cells may be used to detect methane and other trace gasses.

SUMMARY

A system embodiment may include: a camera; a processor in communication with the camera, the processor configured to: capture at least two images of a scene with the camera; compare the captured at least two images to determine at least one of: a motion associated with a movement of the camera and a motion associated with a movement of a gas plume; apply a color to each pixel of the captured images based on at least one of: a direction of movement and a velocity of movement between the at least two captured images; subtract pixels from the colored pixels associated with the movement of the camera; and generate an image of an output of a gas plume based on the subtracted pixels and the applied color pixels.

In additional system embodiments, the camera may be an optical gas imaging (OGI) camera. In additional system embodiments, the OGI camera may be tuned to specific wavelengths in the infra-red (IR). In additional system embodiments, the gas plume may be a trace gas plume.

In additional system embodiments, the captured scene comprises a site with one or more structures. In additional system embodiments, the one or more structures comprise one or more potential gas sources. In additional system embodiments, the captured at least two images may be compared to determine the motion associated with the movement of the camera and the motion associated with the movement of the gas plume.

In additional system embodiments, the color may be applied to each pixel of the captured images based on the direction of movement and the velocity of movement between the at least two captured images. In additional system embodiments, the direction of movement and the velocity of movement of the camera between the at least two captured images may be different than the direction of movement and the velocity of movement of the gas plume. In additional system embodiments, the generated image of the output of the gas plume may be isolated from a background image of the at least two captured images.

A method embodiment may include: capturing at least two images of a scene with a camera; comparing, by a processor in communication with the camera, the captured at least two images to determine at least one of: a motion associated with a movement of the camera and a motion associated with a movement of a gas plume; applying, by the processor, a color to each pixel of the captured images based on at least one of: a direction of movement and a velocity of movement between the at least two captured images; subtracting, by the processor, pixels from the colored pixels associated with the movement of the camera; and generating, by the processor, an image of an output of a gas plume based on the subtracted pixels and the applied color pixels.

In additional method embodiments, the camera may be an optical gas imaging (OGI) camera. In additional method embodiments, the OGI camera may be tuned to specific wavelengths in the infra-red (IR). In additional method embodiments, the gas plume may be a trace gas plume.

In additional method embodiments, the captured scene comprises a site with one or more structures In additional method embodiments, the one or more structures comprise one or more potential gas sources In additional method embodiments, the captured at least two images may be compared to determine the motion associated with the movement of the camera and the motion associated with the movement of the gas plume.

In additional method embodiments, the color may be applied to each pixel of the captured images based on the direction of movement and the velocity of movement between the at least two captured images. In additional method embodiments, the direction of movement and the velocity of movement of the camera between the at least two captured images may be different than the direction of movement and the velocity of movement of the gas plume, and where the generated image of the output of the gas plume may be isolated from a background image of the at least two captured images.

Another method embodiment may include: capturing at least two images of a scene with an optical gas imaging (OGI) camera; detecting, by a processor in communication with the camera, a dominant movement direction and velocity, where the detected dominant movement direction and velocity may be based on a movement of the camera between the captured at least two images; applying, by the processor, a color to each pixel of the captured images based on a direction of movement and a velocity of movement between the at least two captured images; subtracting, by the processor, pixels from the colored pixels associated with the dominant movement direction and velocity; and generating, by the processor, an image of an output of a gas plume based on the subtracted pixels and the applied color pixels, where the gas plume may be accentuated in the generated image.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The described technology concerns one or more methods, systems, apparatuses, and mediums storing processor-executable process steps for the detection of gas plumes using optical gas imaging.

The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-11 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 1:
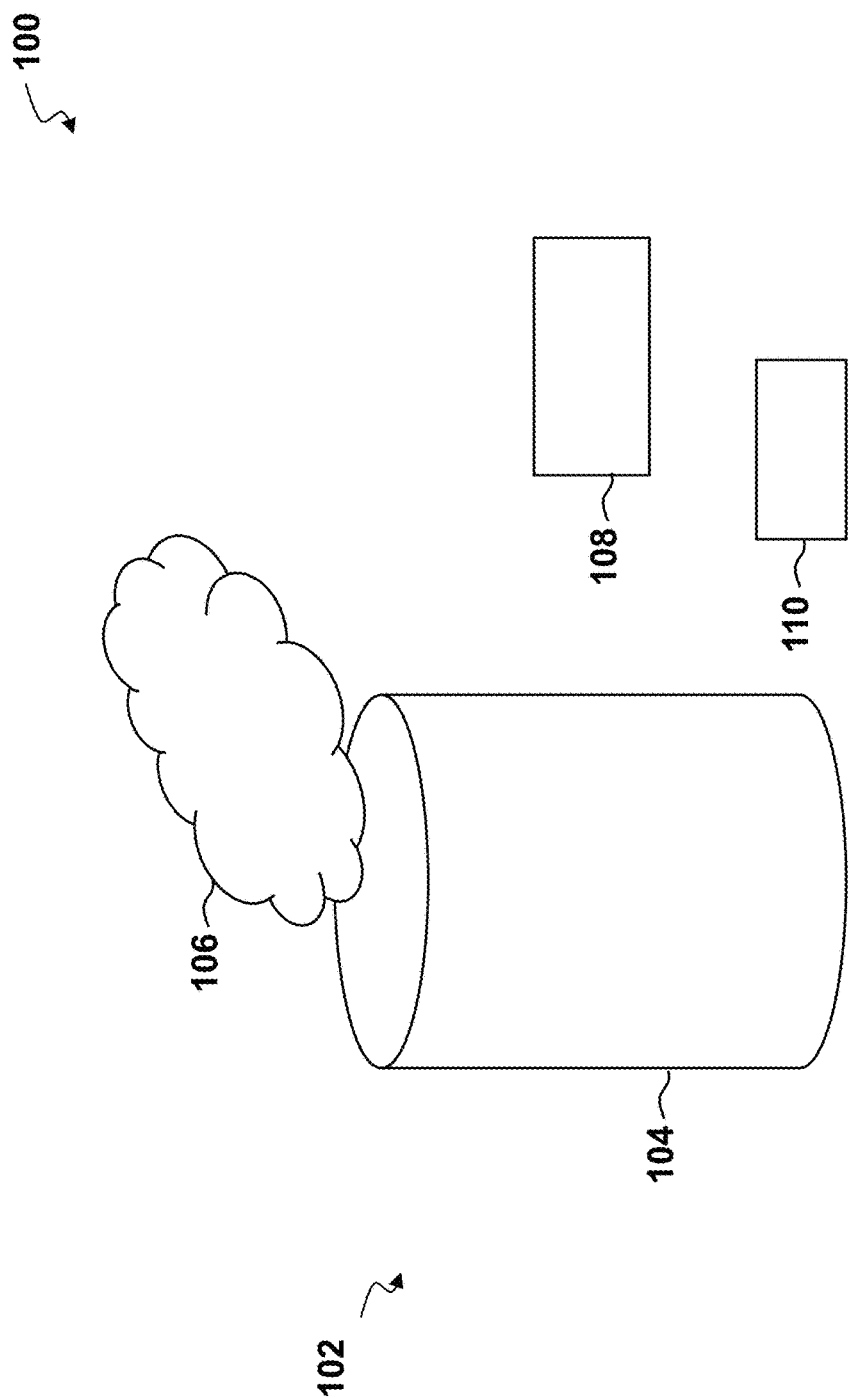
FIG. 1 depicts a system for automated detection of gas plumes using optical gas imaging, according to one embodiment.
Figure 2:
FIG. 2 depicts an optical image of a site, according to one embodiment.

With respect to FIG. 1, a system 100 allows for automated detection of gas plumes 106 using optical gas imaging. The system 100 includes a site 102, such as an industrial site. The site 102 may include one or more gas-emitting structures 104 that may emit a plume of gas 106. The system 100 may also include a camera 108 and a computing device 110 in communication with the camera 108. In one embodiment, the camera 108 is an Optical Gas Imaging (OGI) camera that may be finely tuned to specific wavelengths in the infra-red (IR). The camera 108 may be capable of imaging gas, such as gas plume 106. In one embodiment, the gas plume 106 is a trace gas plume.

When looking at a still image of a site, it may be challenging to detect a gas plume. For example, and with respect to FIG. 2, a site 112 is shown as a single captured image of the camera 108 of FIG. 1. In this example, gas emitted from a flare tower 114 may be difficult to see with the naked eye. In operation, the camera 108 of FIG. 1 and/or the gas plume 106 may move as the camera takes continual footage, such as a series of images or a video. A gas plume 106 moving at high speed or low speed may have distinguishing features, making it possible for gas emissions to be extracted from footage of the camera 108.

Figure 3:
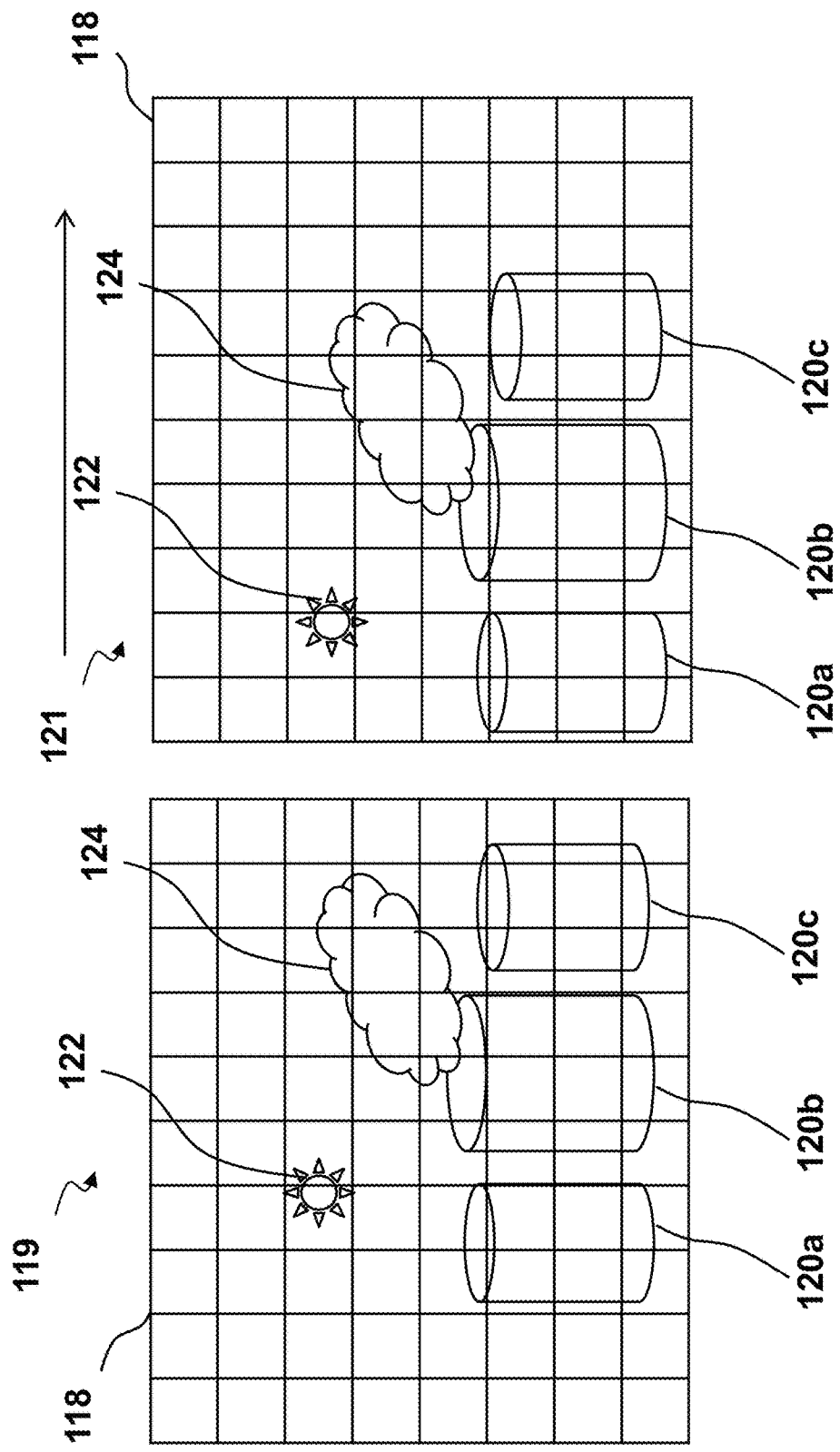
FIG. 3 depicts a schematic of pixel maps of a gas emission site, according to one embodiment.

FIG. 3 shows two pixel maps 118 of a first image 119 and a second image 121 within a field of view (FOV) of the camera 108 of FIG. 1. The first image 119 and the second image 121 both include several structures 120a, 120b, 120c; a background object 122, such as the sun; and a gas plume 124 associated with one of the structures 120b. In one embodiment, the camera 108 captures the first image 119 shown in the left panel. At some later time, the camera 108 captures the second image 121 shown in the right panel. Upon capturing of the second image 121, the camera 108 may have moved slightly to the right, shifting the pixel map 118 to the right. In this example, none of the objects in the field of view have moved in the time between the camera 108 of FIG. 1 capturing the first image 119 and the camera 108 of FIG. 1 capturing the second image 121. However, the movement of the camera 108 of FIG. 1 to the right makes it appear as though the objects 122, 120a, 120b, 120c, 124 in the second image 121 have moved to the left.

Figure 4:
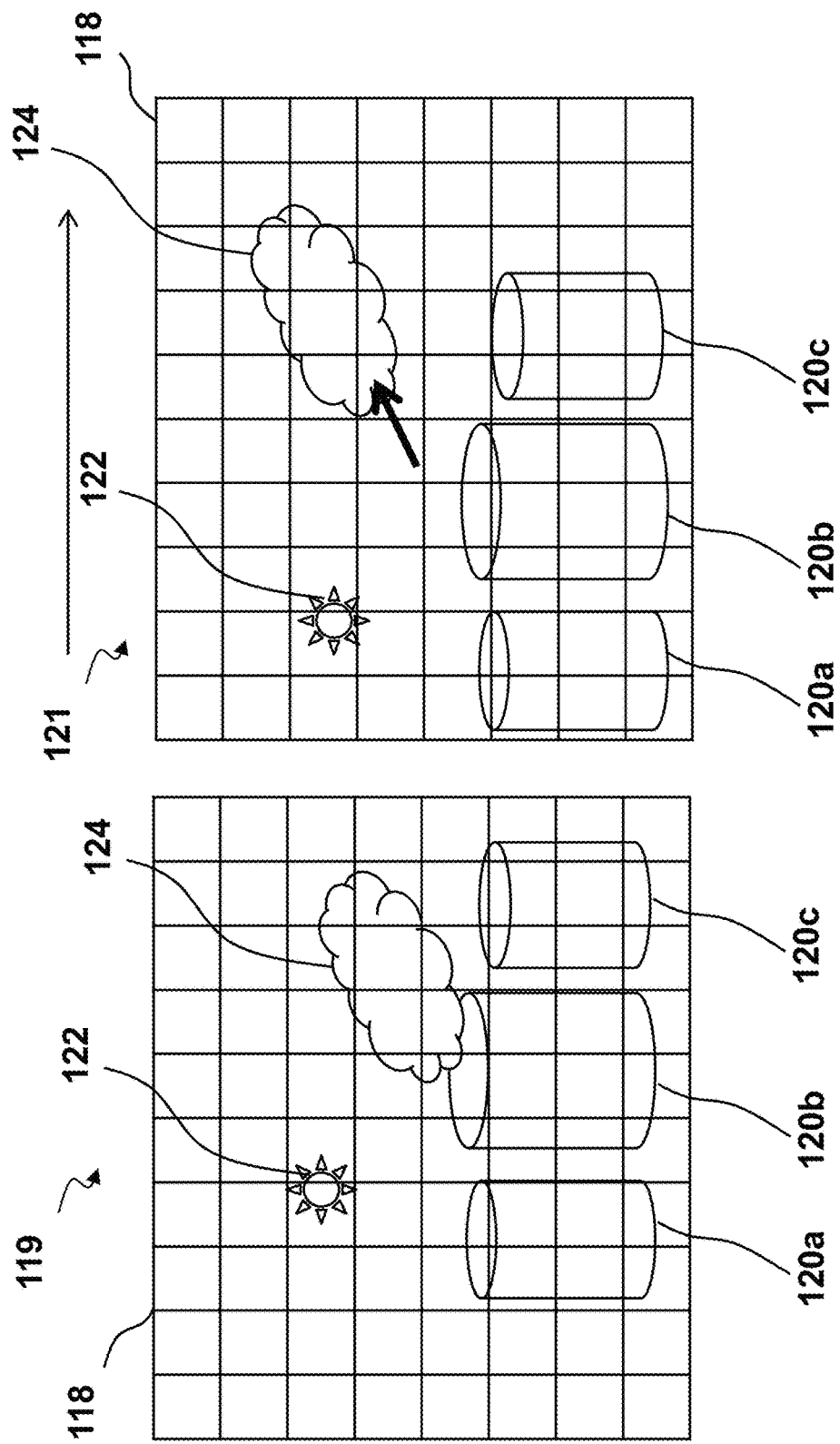
FIG. 4 depicts an alternative schematic of pixel maps of a gas emission site, according to one embodiment.

FIG. 4 illustrates the same elements as FIG. 3. With respect to the second image 121, the gas plume 124 has moved to the right in the time between the capturing of the first image 119 by the camera 108 of FIG. 1 and the capturing of the second image 121 by the camera 108 of FIG. 1. Therefore, in the second image 121, two separate motions have occurred. First, the camera 108 has moved to the right. Thus, objects 120a, 120b, 120c and background object 122 appear to move to the left. Second, the gas plume 124 has moved up and to the right with a particular velocity.

Figure 5:
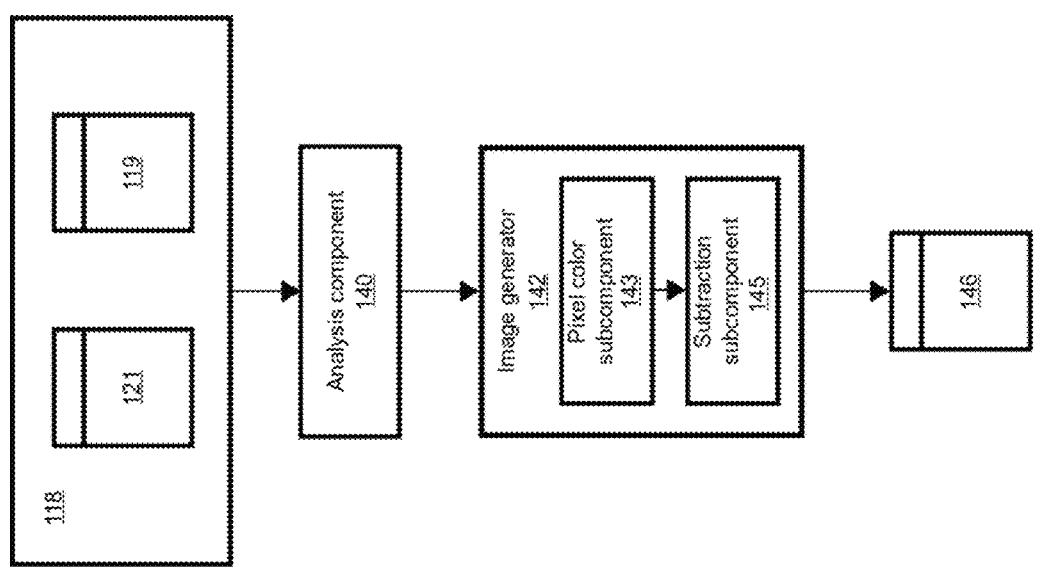
FIG. 5 depicts a block diagram for a system for automated detection of gas plumes, according to one embodiment.

With respect to FIG. 5, the pixel maps 118 of a gas plume include a plurality of image, such as at least two images. One of the images may be the first image 119 and the other image may be the second image 121. Both the first image 119 and the second image 121 may first be processed by the analysis component 140. The analysis component 140 may determine a dominant motion from comparing the first image 119 to the second image 121. The dominant motion determined from the images may be based on at least one of: a camera movement and a gas plume movement. After determining the dominant motion, the analysis component 140 may pass the dominant motion data to an image generator 142. The image generator 142 may use the dominant motion data to generate an output image 146. The image generator 142 may generate the output image 146 by first having a pixel coloring subcomponent 143 color each pixel in the first picture 119 and the second picture 121 based on any movement captured between the two images. Then, a subtraction subcomponent 145 may subtract colored pixels that are associated with the dominant motion data. The analysis component 140, image generator 142, pixel color subcomponent 143, and/or subtraction subcomponent 145 may be located on the computing device 110 of FIG. 1.

The computing device 110 of FIG. 1 may process images, such as first image 119 and second image 121, to detect movement of gas in the footage. Processes performed by the processor may include minimizing the influence of background in the image, detecting moving pixels and tracking of pixel movement, and segmenting the scene and producing an output of the location of the gas plume.

In one embodiment, the computing device 110 may execute steps to perform a dense optical flow algorithm, such as a Gunner Farneback algorithm. More specifically, an image may have a very large collection of pixels (such as pixels of the pixel map 118), and a corresponding combined sequence of images may reveal the movement of the pixels from frame to frame. These pixels are changing constantly as one frame is replaced by another. The camera 108 is also moving and this may contribute to the overall direction to which pixels appear to be moving in the overall scene in the field of view. The optical flow algorithm executed by the computing device 110 may execute steps to quantify the movement in the scene in real time. In one embodiment, the Gunner Farneback dense optical flow algorithm utilizes polynomial expansion to estimate the motion that occurred in two frames. For example, considering the exact quadratic polynomial:

$$f_1 = x^T A_1 x + b_1^T x + c_1$$

A new signal may be constructed that has been translated by displacement d:

$$f_2(x) = f_1(x-d) = x^T A_2 x + b_2^T x + c_2$$

Where equating the coefficients in the quadratic polynomials yields:

$$A_2 = A_1$$

$$b_2 = b_1 - 2A_1 d$$

$$c_2 = d^T A_1 d - b_1^T d + c_1$$

The translation may then be extracted by the processor of the computing device 110 to show the movement of, for instance, a gas plume in footage of the camera 108.

There may be a dominant movement direction and velocity at which most of the scene is moving due to motion of the camera 108. For instance, there is the apparent bulk movement of structures 120a, 120b, 120c and background object 122 to the left between first image 119 and second image 121, while the isolated gas plume 106 appears to move up and to the right. Using the Gunner Farneback algorithm, the amount of movement may be quantified as the displacement d of the pixels from the position x in the first image 119 to the position x-d in the second image 121, and the velocity may be quantified as that displacement divided by the time between the capturing of image 119 and image 121. In one embodiment, pixels associated with the dominant movement may be given a value. In other embodiments, pixels associated with the dominant movement are given as a color representation of the value.

Figure 6A:
FIGS. 6A-6C depict images processed for automated detection of gas plumes using optical gas imaging, according to one embodiment.

For example, FIG. 6A shows an image of a site 126 with a plurality of structures 128 captured by a camera 108 of FIG. 1, such as an OGI camera. The processor of the computing device 110 executes process steps to automate detection of gas plumes using the optical gas image of FIG. 6A as position x.

Figure 6B:

FIG. 6B shows a dominant color representation 130 of the quantified displacement corresponding to the movement of the camera 108 of FIG. 1 in a specific direction and with a specific velocity. In this instance, the camera 108 has moved down, and the color representation 130 is associated with the structures 128 of the FIG. 6A, as they have all moved in unison. Objects that are independent of the dominant motion associated with motion of the camera 108 may then be accentuated in the scene and further processed for other machine vision tasks.

Figure 6C:
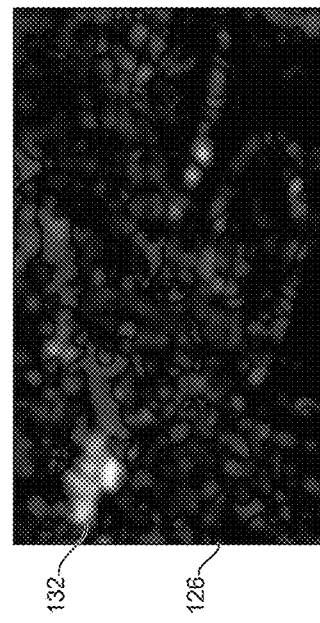

In one embodiment, the pixel values/colors of the dominant color representation 130 associated with motion of the camera 108 of FIG. 1 may be removed from the image and anything that is not moving in a similar manner to the bulk motion of the camera 108 may be left on the image, as shown in FIG. 6C. For example, remaining pixel colors 132 may be associated with a gas plume emanating from at least one structure 128. In one embodiment, more than two images may be processed for the automated detection of gas plumes using optical gas imaging, as described above. In one embodiment, the velocity of the camera may be subtracted from the velocity of the gas plume.

In one embodiment, it is possible that even if camera movement occurs in the same direction as the gas plume, the magnitude of the movement may be different for the camera motion versus the gas plume motion, therefore causing a different "color" to represent the plume. As such, the gas plume will still be left on the image after the velocity subtraction. The colors left over on the image accentuate the movement of everything that is not moving with the camera or that is static. In one embodiment, the pixel value representation may be shown with arrows pointing in the direction of movement instead of colors.

Figure 7:
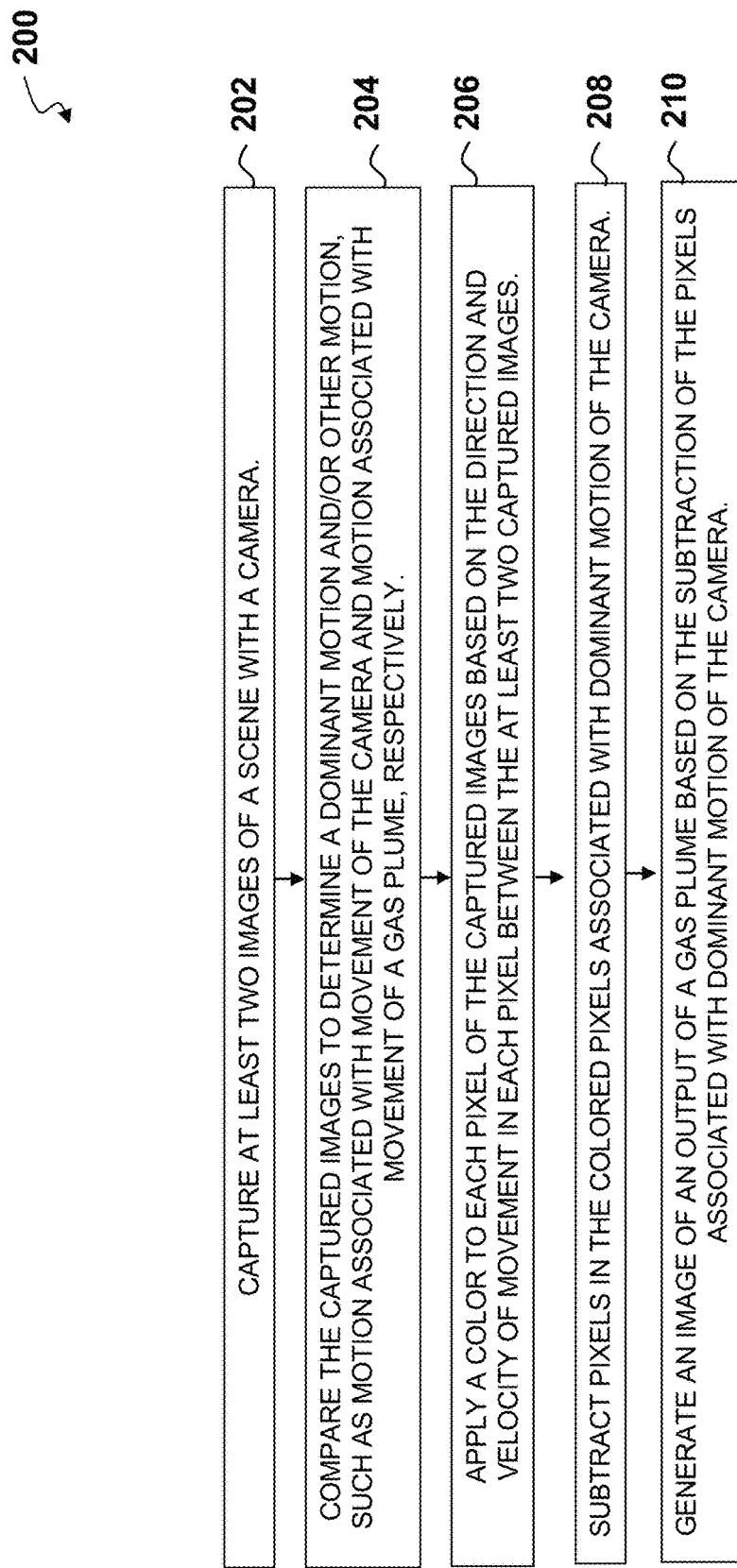
FIG. 7 depicts a flowchart of a process for automated detection of gas plumes using optical gas imaging, according to one embodiment.

With respect to FIG. 7, a flowchart 200 of a process for automating detection of gas plumes using optical gas imaging is illustrated. At step 202, the camera 108 captures at least two images of a scene. At step 204, the images are compared to detect dominant motion and any other motion, such as motion associated with movement of the camera and motion associated with movement of a gas plume, respectively. In one embodiment, a processor executes steps to determine the motions based on a dense optical flow application. At step 206, a color is applied to each pixel based on the direction and velocity of each pixel between the at least two captured images. At step 208, the pixels associated with dominant motion of the camera based on the pixels' determined color are subtracted. At step 210, the output of a gas plume based on the subtraction of the pixels associated with dominant motion of the camera is produced as an image, thereby detecting gas emission. In some embodiments, the output may include a representation of the movement, such as with arrows pointing in the direction of movement. In some embodiments, the camera may be on a substantially stable or fixed platform, which may result in higher accuracy of gas plume detection and/or output.

Figure 8:
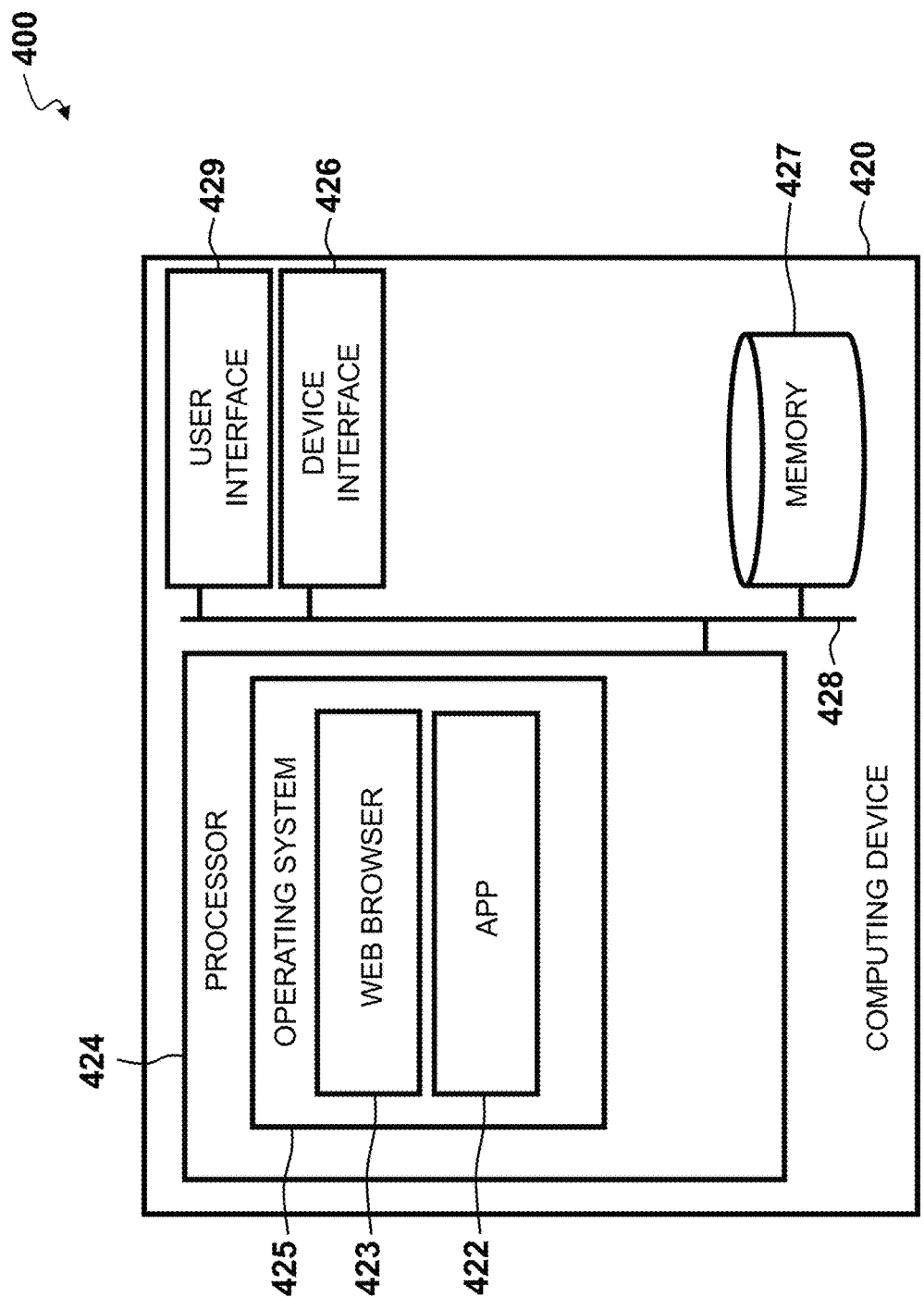
FIG. 8 illustrates an example top-level functional block diagram of a computing device embodiment.

FIG. 8 illustrates an example of a top-level functional block diagram of a computing device embodiment 400. The example operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 9:
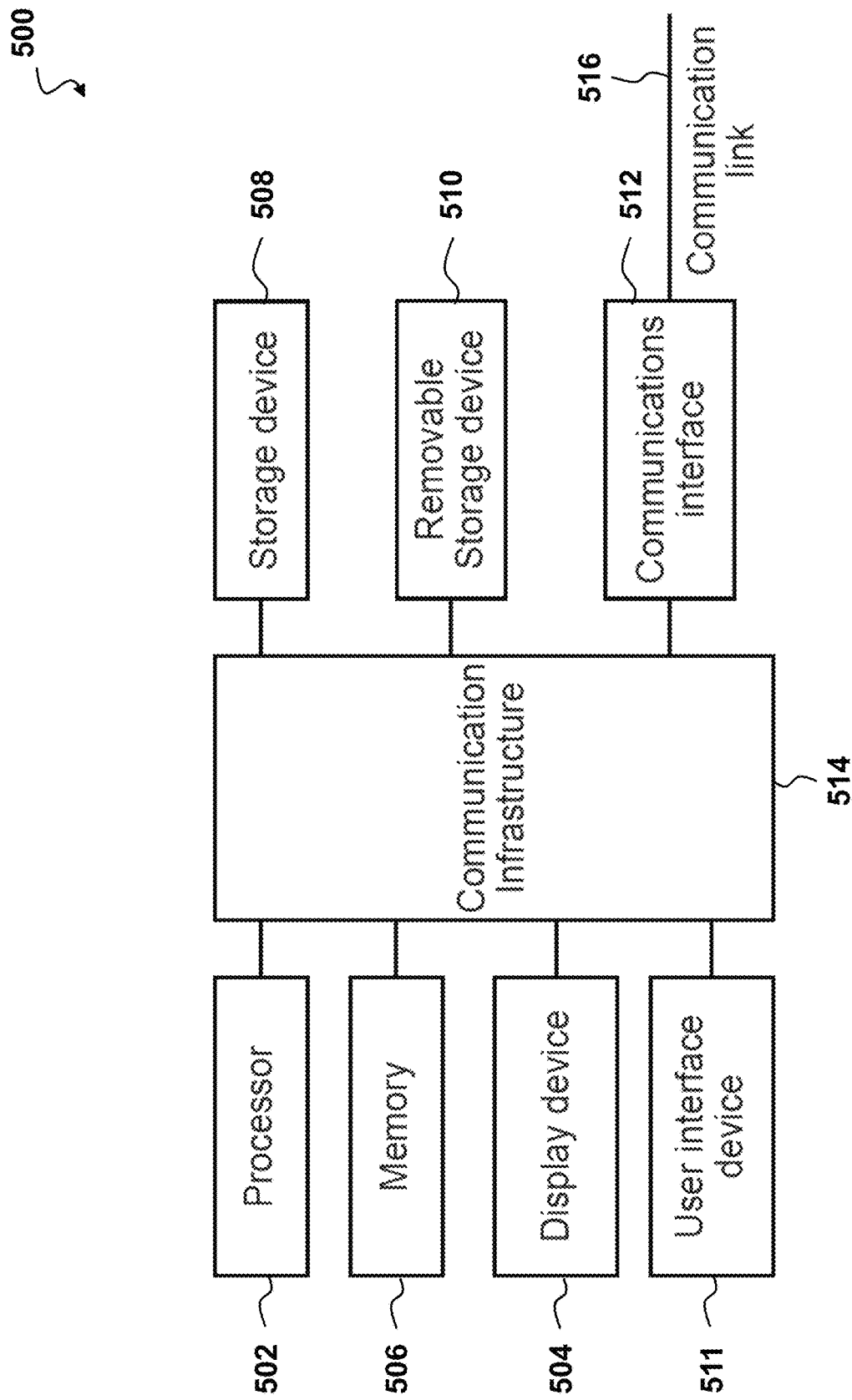
FIG. 9 shows a high-level block diagram and process of a computing system for implementing an embodiment of the system and process.

FIG. 9 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 10:
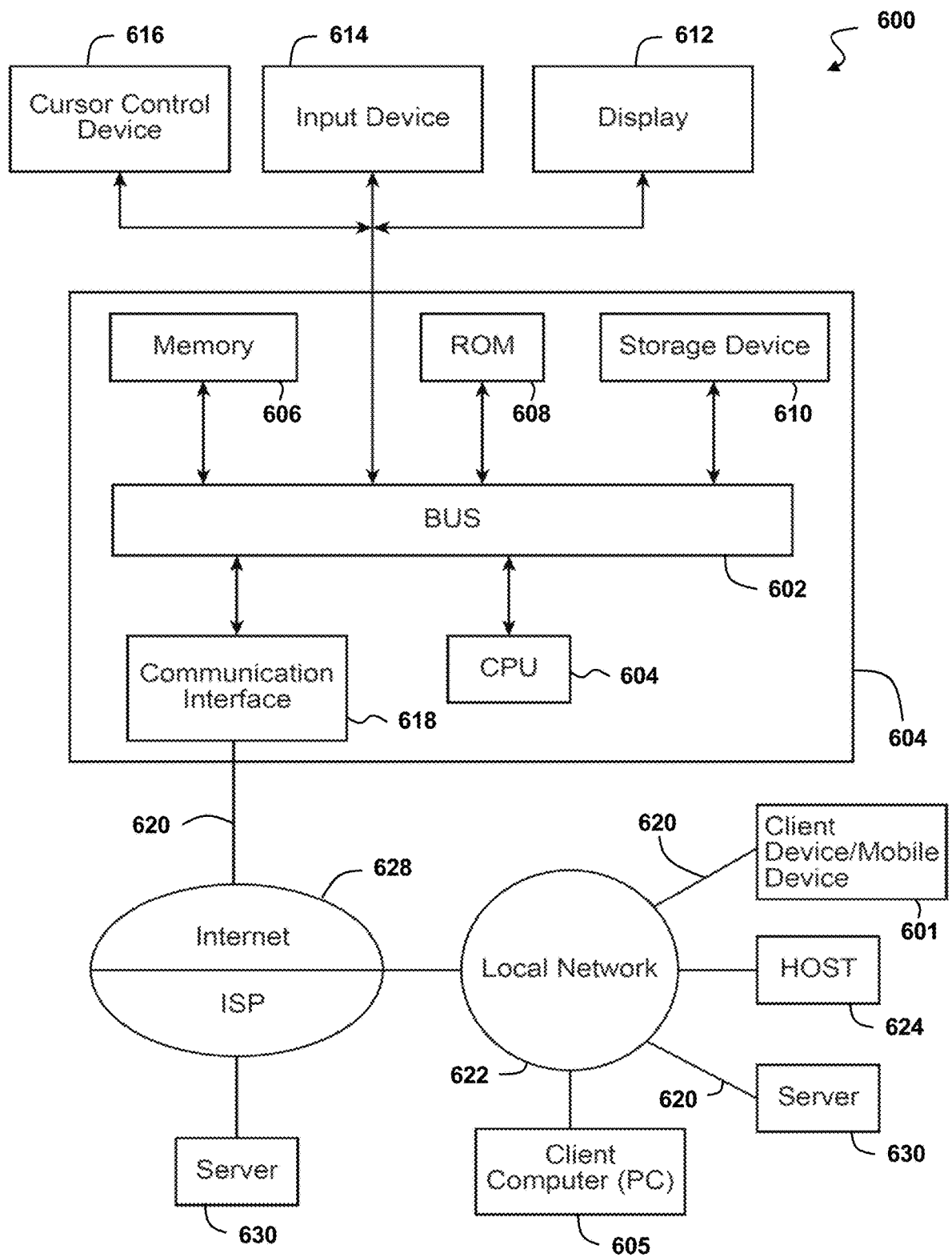
FIG. 10 shows a block diagram and process of an exemplary system in which an embodiment may be implemented.

FIG. 10 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 11:
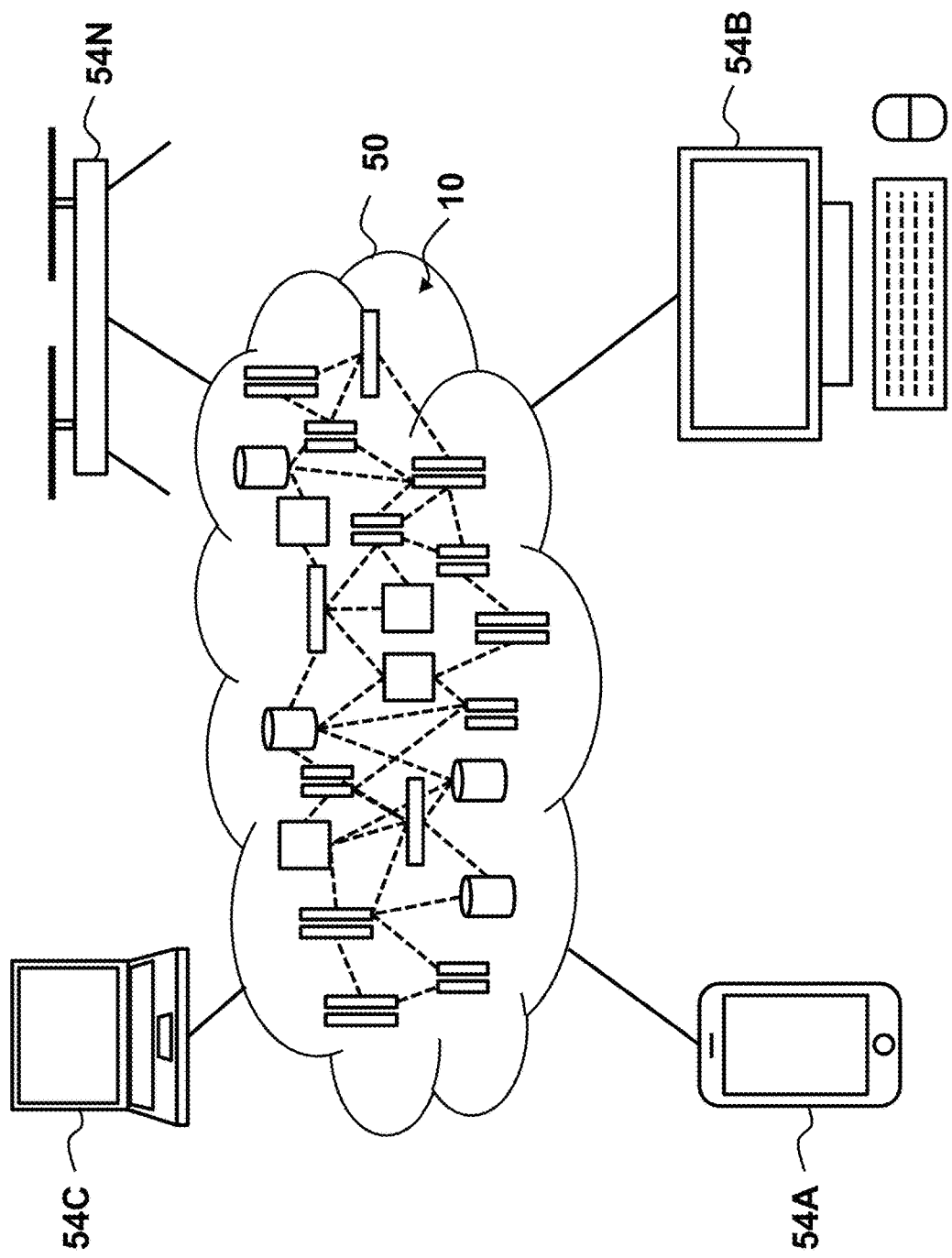
FIG. 11 depicts a cloud computing environment for implementing an embodiment of the system and process disclosed herein.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or UAV system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
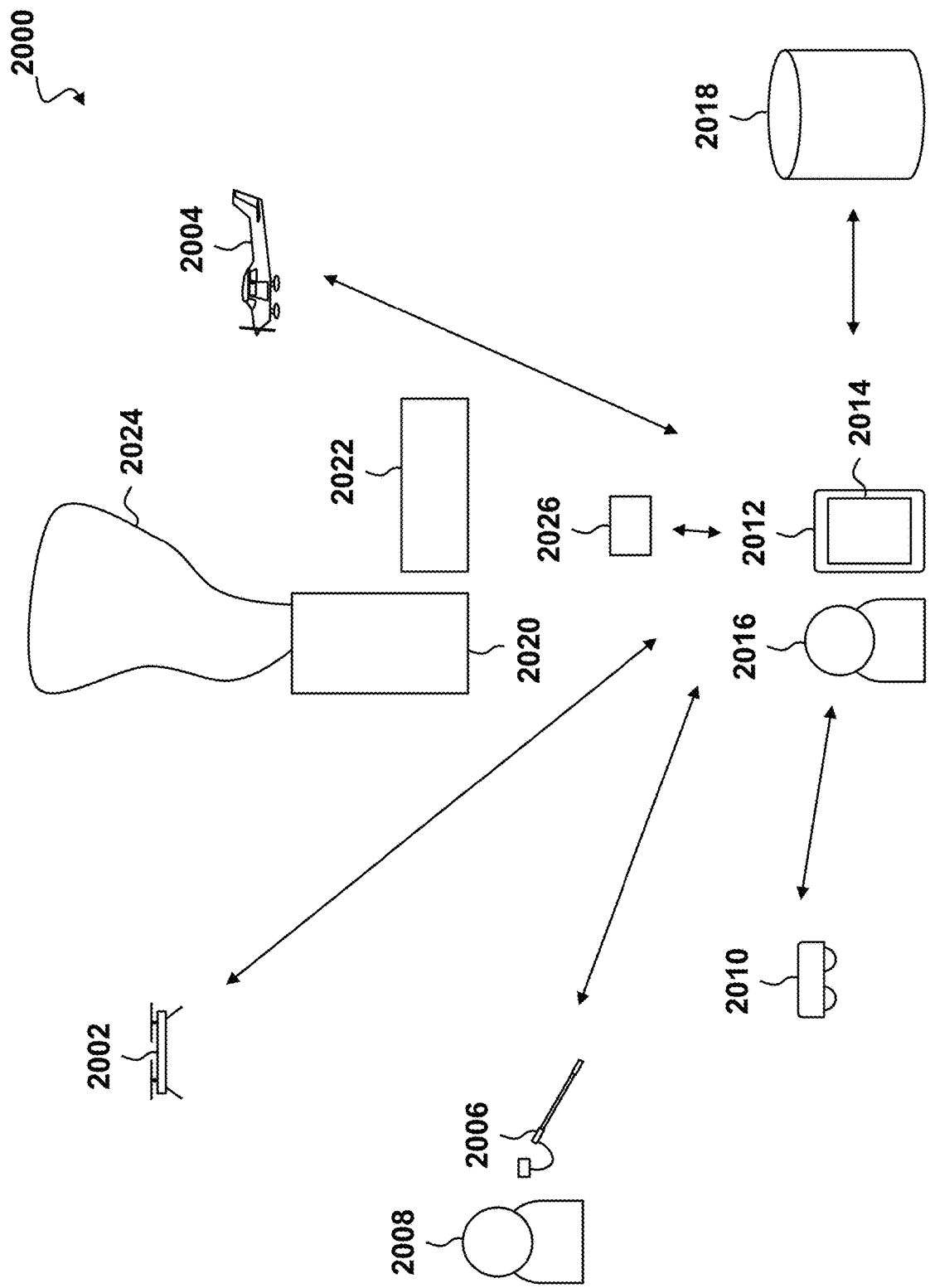
FIG. 12 depicts a system for detecting trace gasses, according to one embodiment.

FIG. 12 depicts a system 2000 for detecting trace gasses, according to one embodiment. The system may include one or more trace gas sensors located in one or more vehicles 2002, 2004, 2006, 2010. The one or more trace gas sensors may detect elevated trace gas concentrations from one or more potential gas sources 2020, 2022, such as a holding tank, pipeline, or the like. The potential gas sources 2020, 2022 may be part of a large facility, a small facility, or any location. The potential gas sources 2020, 2022 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as SO, SO2, SO3, S7O2, S6O2, S2O2, and the like. A trace gas leak 2024 may be present in a potential gas source 2020. The one or more trace gas sensors may be used to identify the trace gas leak 2024 and/or the source 2020 of the trace gas leak 2024 so that corrective action may be taken.

The one or more vehicles 2002, 2004, 2006, 2010 may include an unmanned aerial vehicle (UAV) 2002, an aerial vehicle 2004, a handheld device 2006, and a ground vehicle 2010. In some embodiments, the UAV 2002 may be a quadcopter or other device capable of hovering, making sharp turns, and the like. In other embodiments, the UAV 2002 may be a winged aerial vehicle capable of extended flight time between missions. The UAV 2002 may be autonomous or semi-autonomous in some embodiments. In other embodiments, the UAV 2002 may be manually controlled by a user. The aerial vehicle 2004 may be a manned vehicle in some embodiments. The handheld device 2006 may be any device having one or more trace gas sensors operated by a user 2008. In one embodiment, the handheld device 2006 may have an extension for keeping the one or more trace gas sensors at a distance from the user 2008. The ground vehicle 2010 may have wheels, tracks, and/or treads in one embodiment. In other embodiments, the ground vehicle 2010 may be a legged robot. In some embodiments, the ground vehicle 2010 may be used as a base station for one or more UAVs 2002. In some embodiments, one or more aerial devices, such as the UAV 2002, a balloon, or the like, may be tethered to the ground vehicle 2010. In some embodiments, one or more trace gas sensors may be located in one or more stationary monitoring devices 2026. The one or more stationary monitoring devices may be located proximate one or more potential gas sources 2020, 2022. In some embodiments, the one or more stationary monitoring devices may be relocated.

The one or more vehicles 2002, 2004, 2006, 2010 and/or stationary monitoring devices 2026 may transmit data including trace gas data to a ground control station (GCS) 2012. The GCS may include a display 2014 for displaying the trace gas concentrations to a GCS user 2016. The GCS user 2016 may be able to take corrective action if a gas leak 2024 is detected, such as by ordering a repair of the source 2020 of the trace gas leak. The GCS user 2016 may be able to control movement of the one or more vehicles 2002, 2004, 2006, 2010 in order to confirm a presence of a trace gas leak in some embodiments.

In some embodiments, the GCS 2012 may transmit data to a cloud server 2018. In some embodiments, the cloud server 2018 may perform additional processing on the data. In some embodiments, the cloud server 2018 may provide third party data to the GCS 2012, such as wind speed, temperature, pressure, weather data, or the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   a camera;
   a processor in communication with the camera, the processor configured to:
   capture at least two images of a scene with the camera;
   compare the captured at least two images to determine at least one of: a motion associated with a movement of the camera and a motion associated with a movement of a gas plume;
   apply a color to each pixel of the captured images based on at least one of: a direction of movement and a velocity of movement between the at least two captured images;
   subtract pixels from the colored pixels associated with the movement of the camera; and
   generate an image of an output of a gas plume based on the subtracted pixels and the applied color pixels.

2. The system of claim 1, wherein the camera is an optical gas imaging (OGI) camera.

3. The system of claim 2, wherein the OGI camera is tuned to specific wavelengths in the infra-red (IR).

4. The system of claim 1, wherein the gas plume is a trace gas plume.

5. The system of claim 1, wherein the captured scene comprises a site with one or more structures.

6. The system of claim 5, wherein the one or more structures comprise one or more potential gas sources.

7. The system of claim 1, wherein the captured at least two images are compared to determine the motion associated with the movement of the camera and the motion associated with the movement of the gas plume.

8. The system of claim 7, wherein the color is applied to each pixel of the captured images based on the direction of movement and the velocity of movement between the at least two captured images.

9. The system of claim 8, wherein the direction of movement and the velocity of movement of the camera between the at least two captured images is different than the direction of movement and the velocity of movement of the gas plume.

10. The system of claim 9, wherein the generated image of the output of the gas plume is isolated from a background image of the at least two captured images.

11. A method comprising:
    capturing at least two images of a scene with a camera;
    comparing, by a processor in communication with the camera, the captured at least two images to determine at least one of: a motion associated with a movement of the camera and a motion associated with a movement of a gas plume;
    applying, by the processor, a color to each pixel of the captured images based on at least one of: a direction of movement and a velocity of movement between the at least two captured images;
    subtracting, by the processor, pixels from the colored pixels associated with the movement of the camera; and
    generating, by the processor, an image of an output of a gas plume based on the subtracted pixels and the applied color pixels.

12. The method of claim 11, wherein the camera is an optical gas imaging (OGI) camera.

13. The method of claim 12, wherein the OGI camera is tuned to specific wavelengths in the infra-red (IR).

14. The method of claim 11, wherein the gas plume is a trace gas plume.

15. The method of claim 11, wherein the captured scene comprises a site with one or more structures.

16. The method of claim 15, wherein the one or more structures comprise one or more potential gas sources.

17. The method of claim 11, wherein the captured at least two images are compared to determine the motion associated with the movement of the camera and the motion associated with the movement of the gas plume.

18. The method of claim 17, wherein the color is applied to each pixel of the captured images based on the direction of movement and the velocity of movement between the at least two captured images.

19. The method of claim 18, wherein the direction of movement and the velocity of movement of the camera between the at least two captured images is different than the direction of movement and the velocity of movement of the gas plume, and wherein the generated image of the output of the gas plume is isolated from a background image of the at least two captured images.

20. A method comprising:
    capturing at least two images of a scene with an optical gas imaging (OGI) camera;
    detecting, by a processor in communication with the camera, a dominant movement direction and velocity, wherein the detected dominant movement direction and velocity is based on a movement of the camera between the captured at least two images;
    applying, by the processor, a color to each pixel of the captured images based on a direction of movement and a velocity of movement between the at least two captured images;
    subtracting, by the processor, pixels from the colored pixels associated with the dominant movement direction and velocity; and
    generating, by the processor, an image of an output of a gas plume based on the subtracted pixels and the applied color pixels, wherein the gas plume is accentuated in the generated image.

* * * * *